United States Patent [19]
Serdy et al.

[11] Patent Number: 5,990,886
[45] Date of Patent: Nov. 23, 1999

[54] GRAPHICALLY CREATING E-MAIL DISTRIBUTION LISTS WITH GEOGRAPHIC AREA SELECTOR ON MAP

[75] Inventors: Holly Serdy, Bellevue; Suze Woolf, Seattle; David Baumert, Redmond, all of Wash.

[73] Assignee: Microsoft Corporation, Redmond, Wash.

[21] Appl. No.: 08/980,584

[22] Filed: Dec. 1, 1997

[51] Int. Cl.⁶ .................................................. G06F 3/00
[52] U.S. Cl. ........................ 345/329; 345/968; 707/4
[58] Field of Search .................................. 345/326–358, 345/968; 707/3–6; 709/200, 201

[56] References Cited

U.S. PATENT DOCUMENTS

| | | | |
|---|---|---|---|
| 4,833,592 | 5/1989 | Yamanaka | 345/329 |
| 5,049,873 | 9/1991 | Robins et al. | 345/329 |
| 5,261,044 | 11/1993 | Dev et al. | 345/329 X |
| 5,500,929 | 3/1996 | Dickinson | 345/329 X |
| 5,515,488 | 5/1996 | Hoppe et al. | 345/968 X |
| 5,608,899 | 3/1997 | Li et al. | 345/968 X |
| 5,682,525 | 10/1997 | Bouve et al. | 345/968 X |
| 5,734,901 | 3/1998 | Sidhu et al. | 345/329 X |
| 5,790,121 | 8/1998 | Sklar et al. | 345/968 X |
| 5,809,265 | 9/1998 | Blair et al. | 345/329 X |
| 5,910,803 | 6/1999 | Grau et al. | 345/357 |

*Primary Examiner*—John E. Breene
*Attorney, Agent, or Firm*—Lee & Hayes, PLLC

[57] ABSTRACT

An e-mail client in accordance with the invention allows a user to select an e-mail distribution list with reference to a map that shows potential e-mail recipients and their relationships to each other. The user can select a first set of the potential e-mail recipients by designating one of a plurality of available predefined queries. A second set can be selected by positioning a graphical area selector over the map, to graphically encompass the second set of e-mail recipients. The e-mail client creates a distribution list from an intersection of the first and second sets of potential e-mail recipients.

25 Claims, 7 Drawing Sheets

GRAPHICALLY CREATING E-MAIL DISTRIBUTION LISTS WITH GEOGRAPHIC AREA SELECTOR ON MAP

TECHNICAL FIELD

This invention relates to e-mail programs and to methods of creating distribution lists for use in such e-mail programs.

BACKGROUND OF THE INVENTION

Many current e-mail systems allow users to create distribution groups or. lists. A distribution list is a collection of e-mail addresses that are represented in an e-mail program as a single e-mail address. When a message is addressed to a distribution list, the message is sent to each e-mail recipient in the list. The Microsoft Exchange e-mail system is an example of an e-mail system that allows users to use distribution lists.

While distribution lists are a great convenience, they require a user to initially enter the names and e-mail addresses of individual e-mail recipients. In many situations, this can be a significant amount of work. In other situations, it might be desired to select recipients based on properties that are not readily available or discernable to the user, such as geographical location. Current e-mail programs do not aid in selecting e-mail recipients based on such properties.

SUMMARY OF THE INVENTION

The invention is a way to automatically create distribution lists, without requiring a user to manually enter the names and e-mail addresses of individual recipients.

An e-mail program in accordance with the invention displays a map image that graphically indicates a plurality of persons or entities, and that illustrates one or more relationships between different persons or entities. For example, the map might show geographical locations of individual residences or businesses. As another example, a map might comprise an organization chart showing individuals' relative locations in the organizational chart.

The map is associated with a database that includes names, e-mail addresses, and other characteristics of the persons and/or entities indicated on the map. The e-mail program allows a user to easily select a set of these entities, whether the user already knows the names or not, and e-mail addresses to form an e-mail distribution list. More specifically, the e-mail program allows the user to select a set of entities by visual location. The program uses the information in the database to map the displayed location to an e-mail address. A distribution name (alias) can be assigned to the resulting group making it easier to send future mailings to the same group of addresses.

A user can construct a rectangle or other shape over the map so that it encompasses all desired recipients. In response, the e-mail program queries the database to find all potential e-mail recipients within the area defined by the rectangle. A distribution list is formed from these e-mail recipients.

A user can limit the distribution list by specifying a logical query. When a query is specified, the distribution list comprises all e-mail recipients that both satisfy the logical query and that are within the rectangle constructed by the user. The e-mail program graphically highlights e-mail recipients that are defined by the logical query to provide visual feedback to the user. The user can examine and modify the distribution list after it has been formulated in this manner.

DETAILED DESCRIPTION

Figure 1:
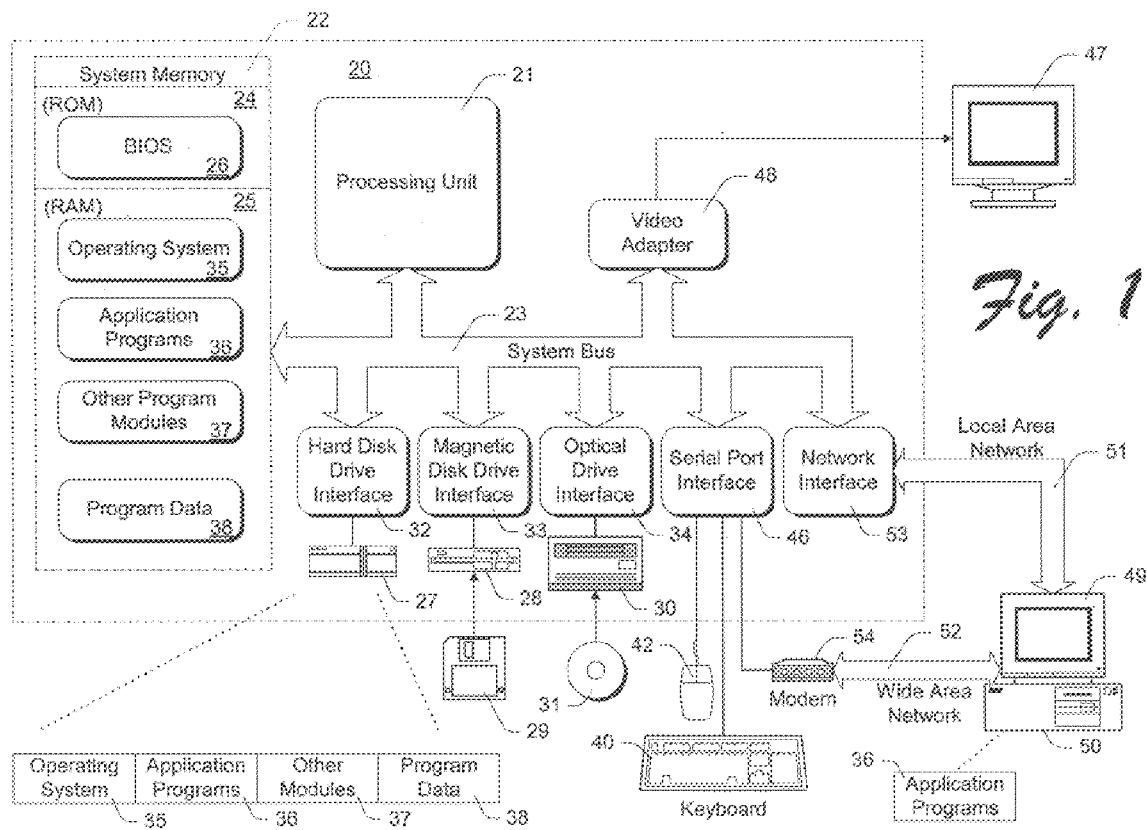
FIGS. 1 and 2 show a computer and network system in accordance with the invention.
Figure 2:
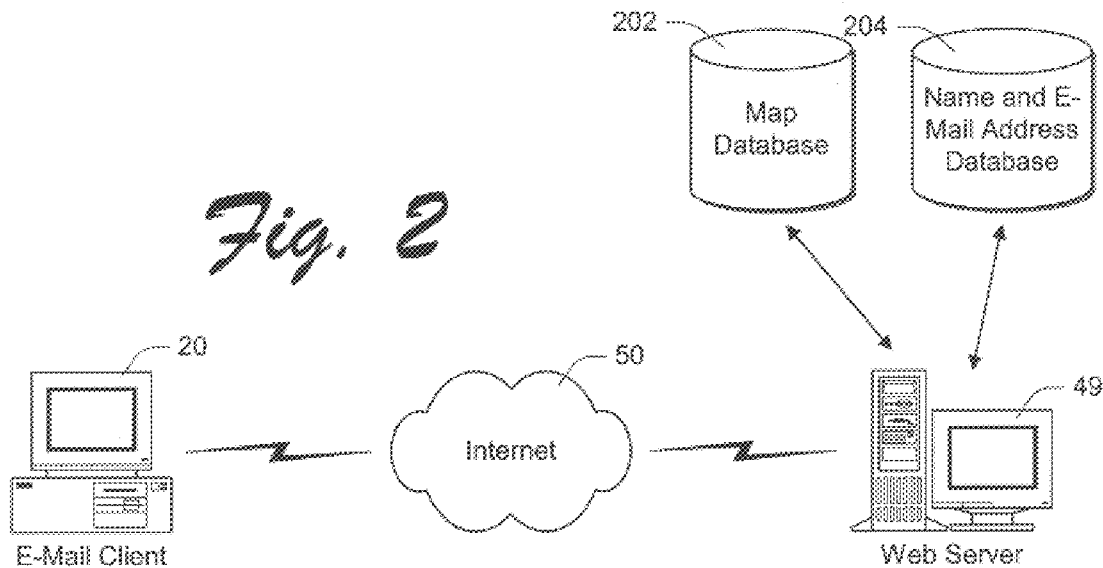

FIGS. 1 and 2 illustrate a computer and network system in accordance with the invention. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including handheld devices, multiprocessor systems, microprocessor-based or programmable consumer electronics, network PCs, minicomputers, mainframe computers, and the like. The invention may also be practiced in distributed computer environments where tasks are performed by remote processing devices that are linked through a communications network. In a distributed computer environment, program modules may be located in both local and remote memory storage devices.

An exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within personal computer 20, such as during startup, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs) read only memories (ROM), and the like, may also be used in the exemplary operating environment.

A number of program modules may be stored on the hard disk, magnetic disk 29 optical disk 31, ROM 24, or RAM 25, including an operating system 35, one or more application programs 36, other program modules 37, and program data 38. A user may enter commands and information into the personal computer 20 through input devices such as keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, personal computers typically include other peripheral output devices (not shown) such as speakers and printers.

The personal computer 20 operates in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

FIG. 2 shows personal computer 20 and remote computer 49, in an environment where network communications takes place through the Internet 50. In accordance with the invention, personal computer 20 is configured as an e-mail client, having an application program 36 (FIG. 1) that comprises an e-mail program. The e-mail program implements a method of creating distribution groups or lists for messages that are to be transmitted over one or more computer networks. Remote computer 49 is configured as an Internet or World Wide Web server. Although not shown in FIG. 2, many other computers are of course connected to send and receive e-mail through the Internet.

Figure 3:
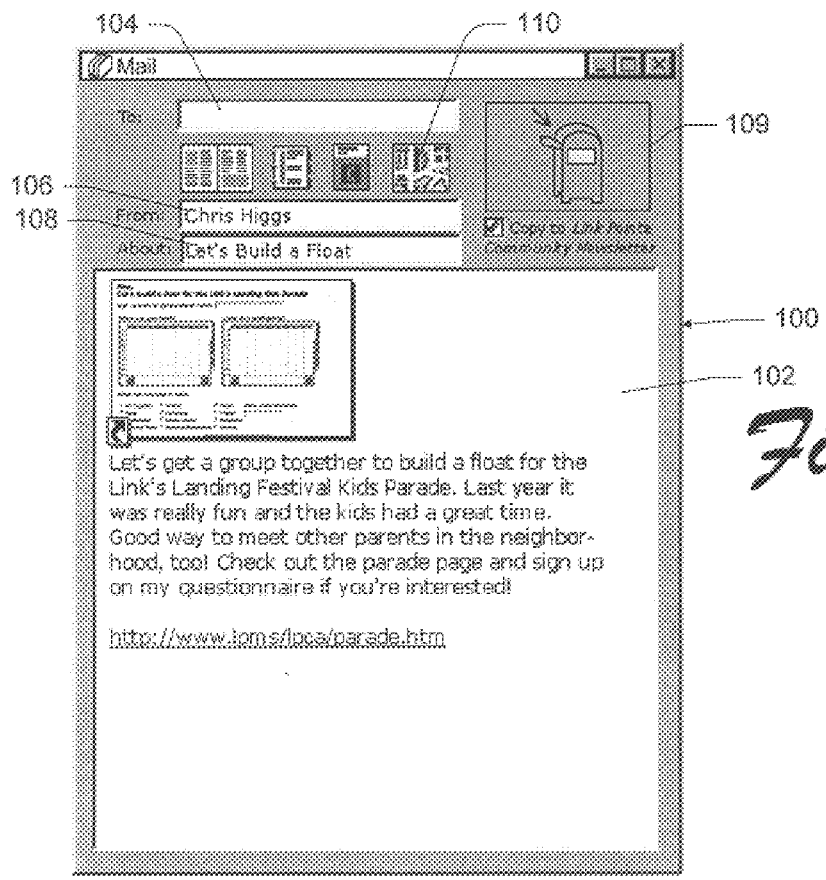
FIGS. 3–8 illustrate a user interface in accordance with the invention.

FIGS. 3–8 illustrate a user interface that is implemented by e-mail program 36 on e-mail client 20 to create a distribution list without requiring a user to manually enter individual e-mail addresses or to select them from a textual list of e-mail addresses. FIG. 3 shows a typical "compose" window 100 that is presented by e-mail program 36 on display device 47. A compose window is used to compose a message and to specify recipients. It includes a message field 102, a "To:" field 104, a "From:" field 106, an "About:" field 108, a "Send:" control 109, and other controls or objects that are not particularly relevant to this invention. In this case, the "To:" line is still blank. This line is used to specify an e-mail recipient or a distribution list.

In addition to conventional interface controls, objects, and fields, compose window 100 includes a group definition button control 110 that can be activated to specify an e-mail distribution group or list in accordance with the invention. A miniature map image forms the iconic representation of button control 110. In other embodiments, the button might be represented by any pictorial icon consistent with the graphic information that the user will select from. The button can be activated in the Windows operating environment by moving an on-screen pointer over the button control and selecting the control using a mouse and its associated controls.

Figure 4:
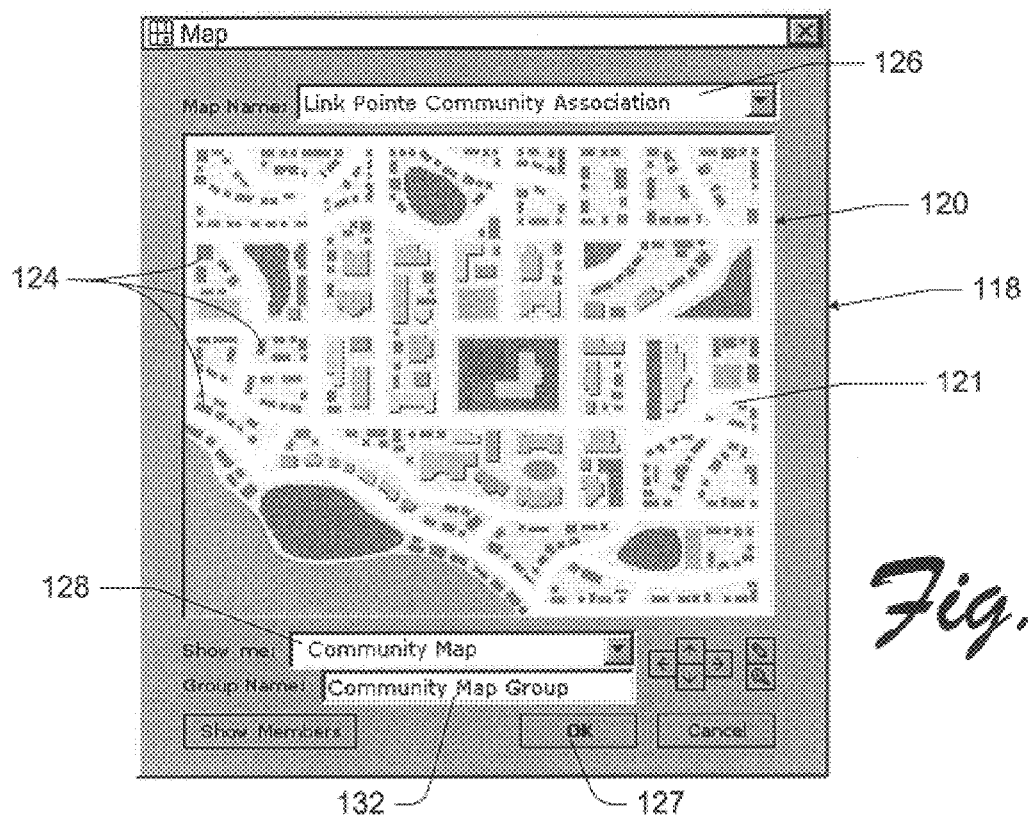

FIG. 4 shows a window 118 that is opened in response to selecting or activating group definition button control 110. This window includes an image field 120 with a displayed geographical image or map 121. In this case, the map shows an urban neighborhood, and includes representations of potential individual e-mail recipients in the form of small blocks 124. The blocks represent residences of the recipients. Although represented in black-and-white for purposes of this document, the map is preferably depicted in multiple colors for better clarity. A map such as this clearly shows the geographical or physical positions of potential e-mail recipients relative to each other. Other types of maps or graphical data representations might show other relationships between e-mail recipients as will be described in more detail below.

Window 118 includes a drop-down control 126 that allows a user to select a particular map or graphic from a plurality of available maps or graphics. Other types of controls can be used in place of the drop-down control. Window 118 also includes controls and features for creating an e-mail distribution group or list that contains entities selected from the recipients shown on map 121.

Generally, creating an e-mail distribution list in accordance with the invention involves selecting a subset of the potential recipients shown on map 121. A set selector 128 provides one way to select potential recipients. Set selector 128 allows the user to select or define a group, set, or subset of entities from those shown on map 121. In the illustrated embodiment, the set selector is implemented as a drop-down control from which the user can select one of a plurality of predefined filters or database search queries. Each filter or query defines a different pool or set of potential e-mail recipients, selected from the recipients shown on map 121. By default, a "map" group is selected, initially corresponding to all of the recipients shown on map 121.

The exact nature of the predefined filters will depend on the type of data that is available regarding individual recipients. In the example described herein, filters are available to select "community association members" or "families with children". Other filters might specify business entities, single parents, individuals or families that own their homes (as opposed to renting), etc.

Figure 5:
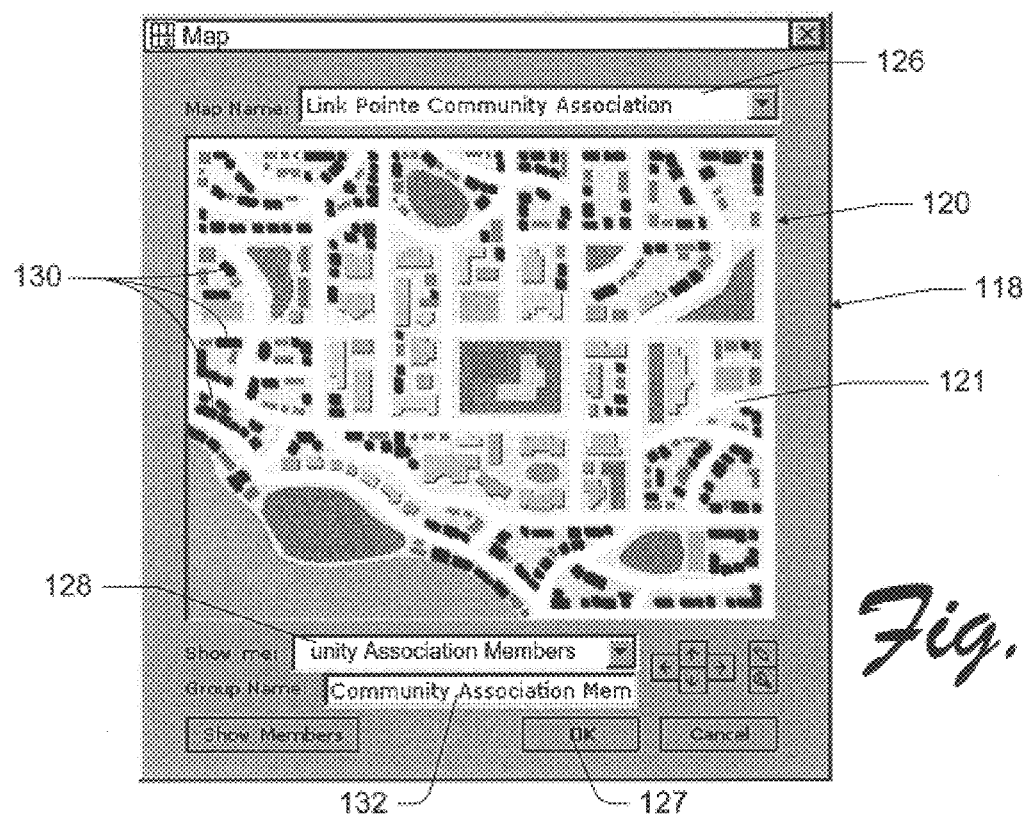

FIG. 5 shows the result of selecting a filter that specifies "community association members." In response to selecting a particular filter, window 118 graphically highlights the potential e-mail recipients that are specified by the particular filter. In the embodiment, shown, the set of individual residences defined by the current filter is highlighted in dark black. In an actual embodiment, residences are preferably highlighted by showing them in a special color. A different color is associated with each different filter. The blocks referenced by numeral 130 are examples of highlighted residences.

Window 118 includes a text control 132 that allows the user to enter a name for the e-mail distribution list or group that the user is creating. This is the name that will eventually be entered in "To:" field 104 of FIG. 3 to specify a distribution list. As the user changes the filter in set selector 128, text control 132 is automatically updated to reflect the nature of the currently selected group. The user can edit or replace the text in control 132.

Figure 6:
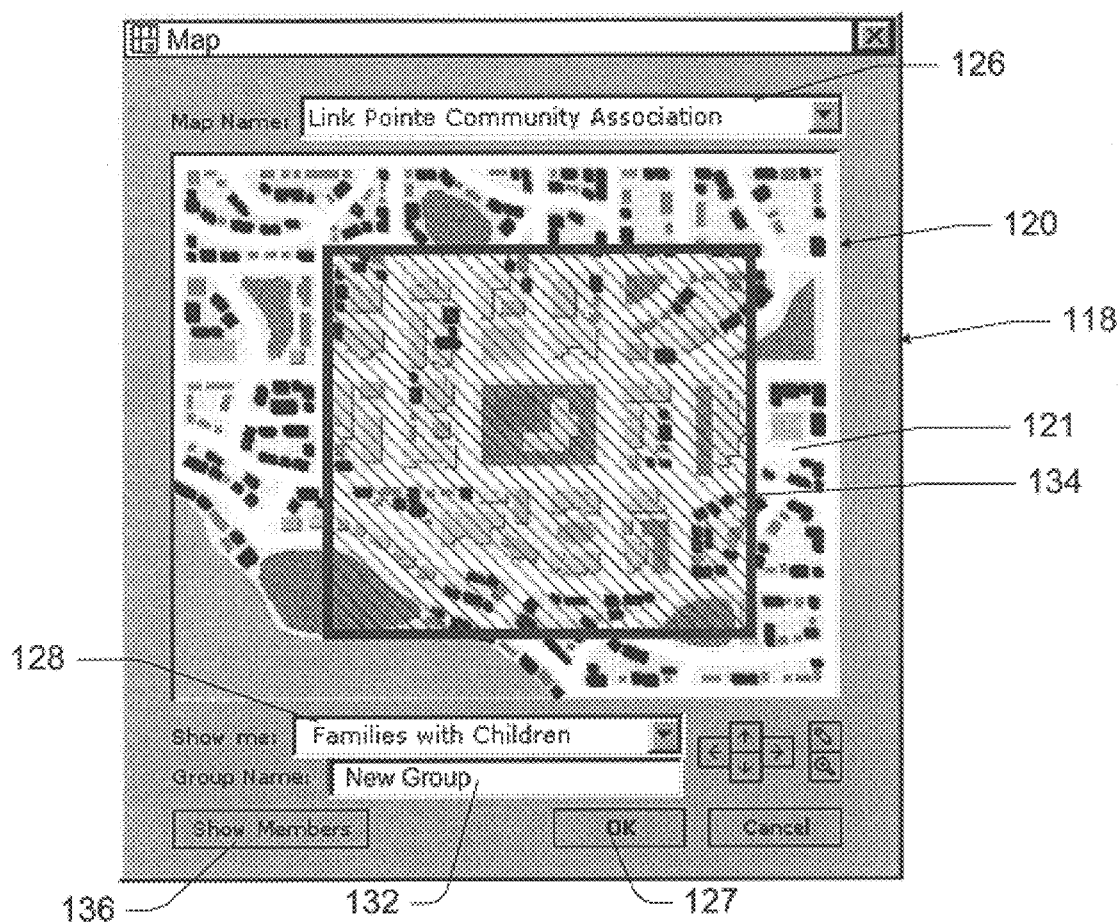

FIG. 6 shows a further feature of the invention that allows a user to more narrowly customize an e-mail distribution list. Window 118 is implemented to allow the user to display and position a graphical area selector 134 over the displayed geographical map 121. In the embodiment shown, the graphical area selector is a rectangle, although other shapes could be used. It has a changeable size and position relative to the displayed map 121. The user draws the area selector using a mouse or other cursor control mechanism. The user places a displayed mouse pointer at one corner of the desired rectangle and presses the left mouse button. The user then moves the mouse pointer to the opposite corner of the rectangle while continuing to press the mouse button, and then releases the mouse button. Once the rectangle is created in this manner, it can be moved and re-sized in a fashion similar to moving a displayed window in a common graphical user interface. Each edge can be moved by "dragging" with the mouse. The entire rectangle can similarly be moved by dragging.

Graphical area selector 134 graphically defines or encompasses its own subset of potential e-mail recipients. This subset consists of all the e-mail recipients that are positioned on map 121 within the area selector.

The two different subsets described above (resulting from the set selector and the area selector) are used to create an actual distribution list. The distribution list consists of the intersection of the recipient subset defined by set selector 128 and the recipient subset defined by graphical area selector 134.

Figure 7:
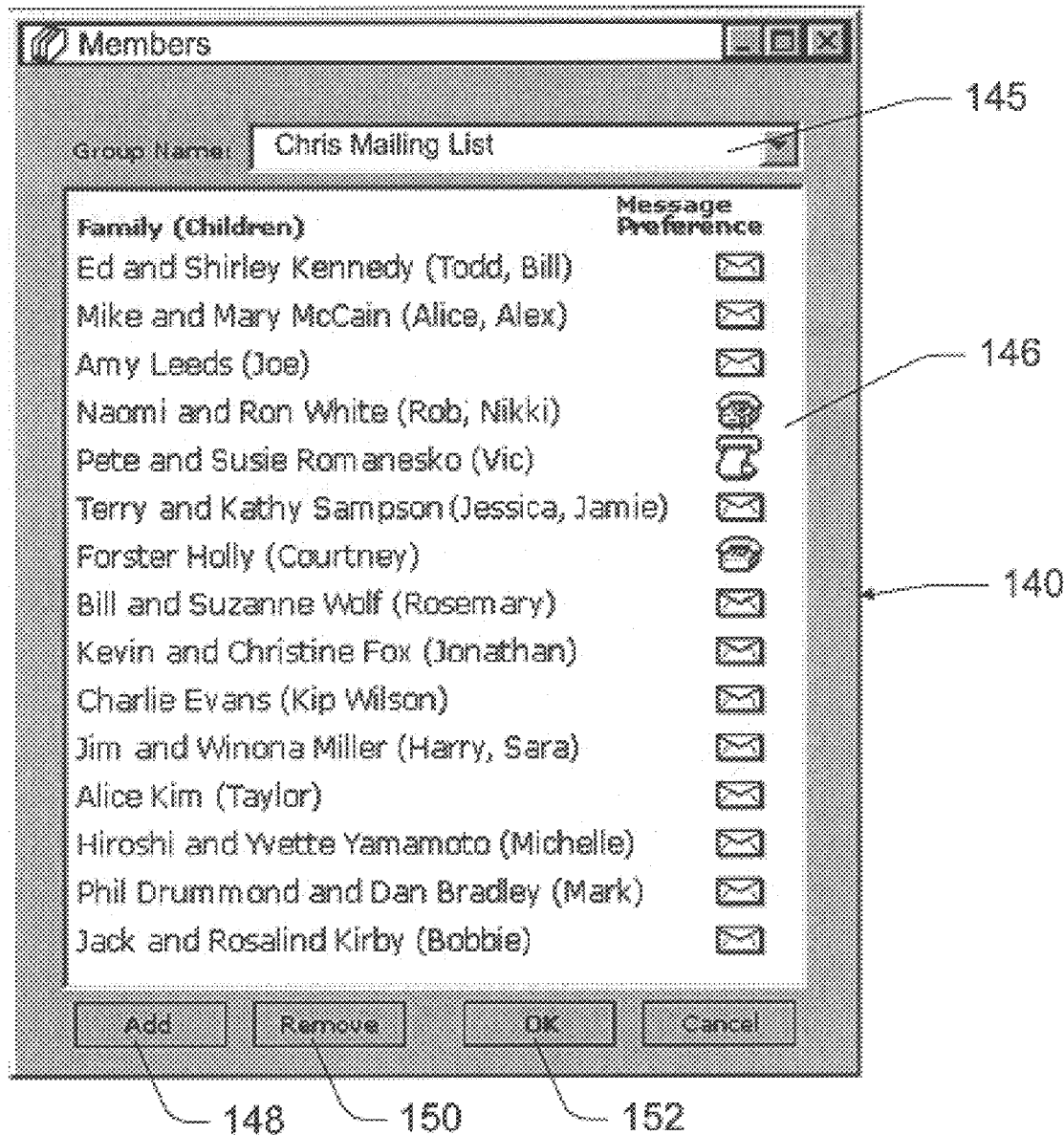
Figure 8:
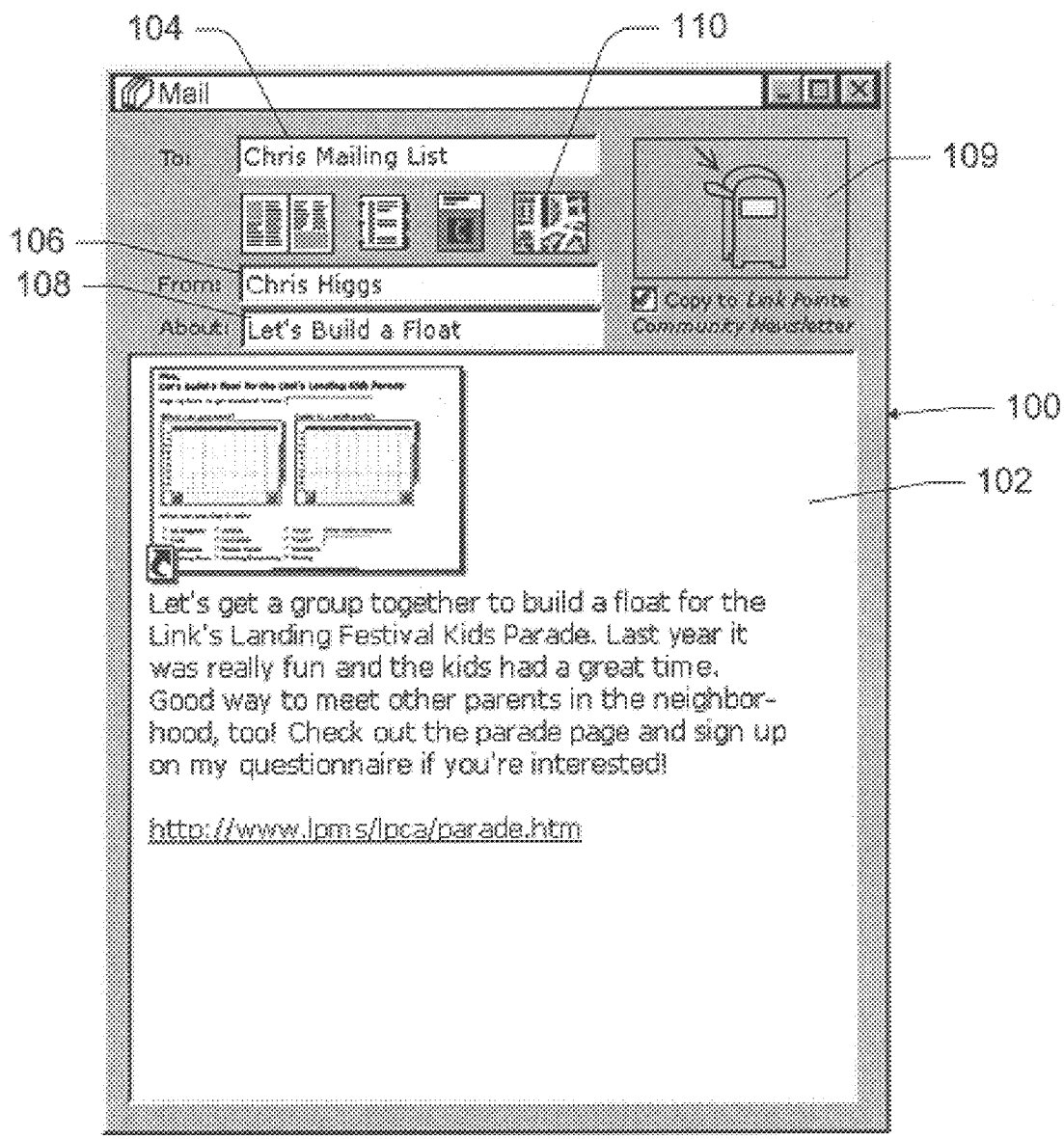

Once the distribution list has been defined using set selector 128 and graphical area selector 134, the user can give a custom name to the group or distribution list by entering text in text control 132. In addition, a button control 136 can be selected to produce a window 140 as shown in FIG. 7. Window 140 shows the user-defined group name in field 145. A field 146 lists all the recipients that have been selected to comprise the corresponding distribution list. "Add" and "Remove" controls 148 and 150 in window 140 allow the user to add additional recipients or to delete recipients from the list. When the user selects the "OK" control 152, the selection process is terminated and the group name is entered in the compose window 100 as shown in FIG. 8. Subsequently, when the user selects the "send" button 109, the message will be sent to all the recipients that were shown in window 140 of FIG. 7. Window 140 of FIG. 7 can be skipped by selecting the "OK" button 127 of FIG. 6.

Note that the process of defining the distribution list can be iterated until the desired results are obtained. For example, a user can select different filters before settling on one. Similarly, the area selector can be changed repeatedly until a correct subset of recipients is defined. Furthermore, specifying filters and positioning an area selector can be performed in any order. That is, the area selector can be positioned before selecting a filter.

Figure 9:
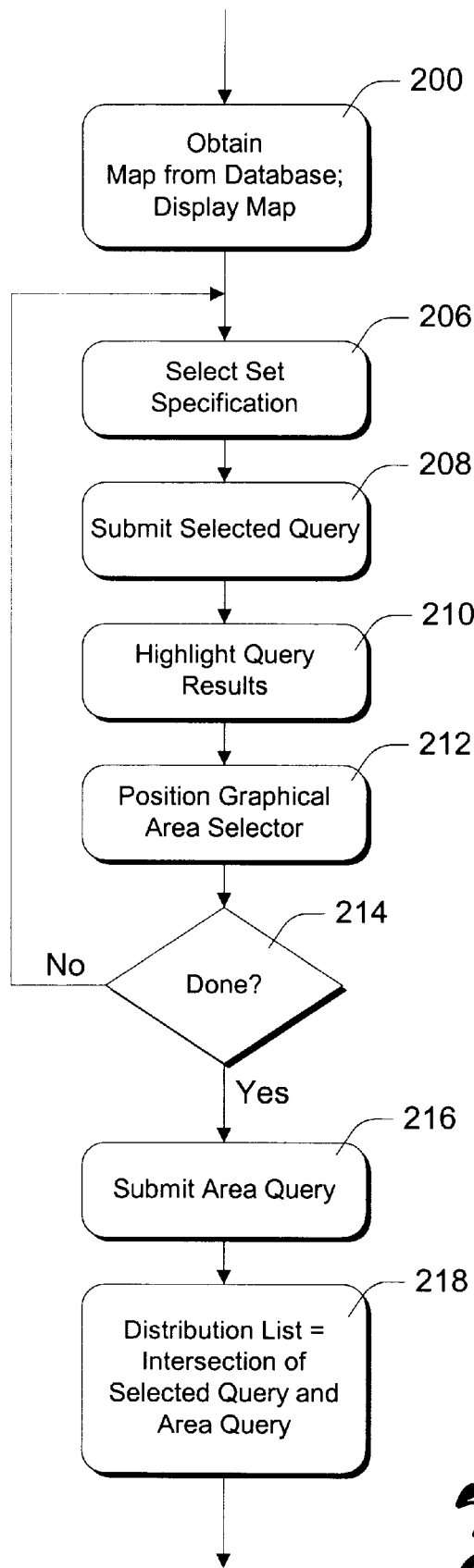
FIG. 9 is a flowchart showing preferred steps in accordance with the invention.

FIGS. 2 and 9 illustrate the underlying processes that implement the features described above. When a user selects the group definition button 110 (FIG. 3), e-mail client 20 (FIG. 2) performs steps 200 of obtaining a default or other selected map from a database and displaying the map. In the described embodiment, the map is obtained from web server 49. Web server 49 maintains a map database 202 and a database 204 of names, e-mail addresses, and additional information relating to individual e-mail recipients. These databases include geographical information for the individual recipients, so that web server 49 can query database 204 to obtain a list of recipients within geographical boundaries defined by a graphical area selector. Specifically, the databases contain information that maps each recipient to a visual location on a map or graphic. As an example, the database might indicate Latitude/Longitude, Plat/Lot, or a street address for different residences. As another example, the database might indicate locations of individual entities in different branches of an organizational chart. As a still further example, the database might the database might merely indicate a set of coordinates for different entities, relative to a given map or graphic.

A step 206 comprises selecting a set of potential e-mail recipients in response to a set specification selected by a user. This step includes a step of displaying a drop-down control from which the user selects a pre-defined query. Thus, in the embodiment described herein, the available set specifications are predefined and correspond to database search queries. Other embodiments might allow the user to create custom database queries.

A step 208 comprises submitting the selected set specification or query to web server 49. The web server executes the query against database 204 and returns the query results: a set of potential e-mail recipients. A step 210 comprises graphically highlighting the recipients that are within this set.

A step 212 comprises creating and positioning a graphical area selector. This includes a potential step of changing the size and position of the area selector with respect to the displayed geographical map, in response to user input.

Steps 206, 208, 210, and 212 are repeated, as indicated by decision block 214, until the user is satisfied with the group selection. A subsequent step 216 comprises formulating and submitting an area query to web server 49 based on the graphical area selector defined by the user. Web server 49 executes the query to determine an area-defined set of potential e-mail recipients, and returns this set to e-mail client 20.

A step 218 is then executed, which comprises actually creating an e-mail distribution list from the two sets of potential e-mail recipients. The distribution list comprises an intersection of the two recipient sets defined by the set selector and the area selector, respectively. As discussed above, the user is given subsequent opportunity to manually modify the distribution list.

The embodiment described above illustrates the invention in a particularly advantageous environment, where potential e-mail recipients can be selected based on geographic or physical positioning. However, the invention is potentially useful in other situations, where individuals and other e-mail recipients can be represented graphically in ways other than geographical maps. For example, individuals might be represented graphically on an organizational map or chart, and the methods described above would be useful in allowing a user to define a subset of such individuals. Similarly, e-mail recipients and other individuals might correspond to different areas of a bar chart or pie chart, or some other type of chart. Such charts, such as organization charts, bar charts of test scores, etc, can also be used for graphically selecting e-mail recipients.

The invention provides a very convenient way to specify e-mail recipients, especially in situations where such recipients are to be specified not by name, but by some other properties that can be the subject of a query or that can be graphically represented.

Although the invention has been described in language specific to features and/or methodological steps, it is to be understood that the invention defined in the appended claims is not necessarily limited to the specific features or steps described. Rather, the specific features and steps are disclosed as preferred forms of implementing the claimed invention.

We claim:

1. A computer-readable storage medium having an e-mail program that is executable to perform the following steps:

displaying a geographical image that shows potential e-mail recipients and their positions relative to each other;

selecting a first set of the potential e-mail recipients in response to a set specification selected by a user;

positioning a graphical area selector with respect to the displayed geographical image in response to user input, wherein the graphical area selector graphically encompasses a second set of the potential e-mail recipients;

creating an e-mail distribution list that comprises an intersection of the first and second sets of the potential e-mail recipients.

2. A computer-readable storage medium as recited in claim 1, the e-mail program being executable to perform a further step that comprises graphically highlighting the potential e-mail recipients that are in the first set.

3. A computer-readable storage medium as recited in claim 1, wherein the graphical area selector has a size and position relative to the geographical image, and wherein the positioning step includes changing the size and position of the graphical area selector.

4. A computer-readable storage medium as recited in claim 1, wherein the selecting step includes displaying a drop-down control from which the user selects a predefined query.

5. A computer-readable storage medium as recited in claim 1, wherein the graphical area selector is a rectangle having a changeable size and position relative to the displayed geographical image.

6. A method of creating a distribution list for messages that are to be transmitted over a computer network, comprising the following steps:

displaying an image that graphically indicates different potential e-mail recipients and one or more relationships between the e-mail recipients;

positioning a graphical area selector with respect to the displayed image in response to user input, wherein the graphical area selector graphically encompasses an area representing a first set of the potential e-mail recipients;

creating the e-mail distribution list from the first set of the potential e-mail recipients.

7. A method as recited in claim 6, wherein the graphical area selector is a rectangle having a changeable size and position relative to the displayed image.

8. A method as recited in claim 6, wherein the positioning step comprises changing the size and position of the graphical area selector in response to user input.

9. A method as recited in claim 6, wherein the displayed image is a geographic map showing physical positions of the different potential e-mail recipients relative to each other.

10. A method as recited in claim 6, further comprising an additional step of selecting a second set of the potential e-mail recipients in response to a query selection by a user, wherein the creating step comprises creating the e-mail distribution list from an intersection of the first and second sets of potential e-mail recipients.

11. A method as recited in claim 6, further comprising the following additional steps:

selecting a second set of the potential e-mail recipients in response to a query selection by a user; and graphically highlighting the potential e-mail recipients that are in the second set.

12. A method as recited in claim 6, further comprising an additional step of selecting a second set of the potential e-mail recipients in response to a query selection by a user, wherein:

the creating step comprises creating the e-mail distribution list from an intersection of the first and second sets of potential e-mail recipients; and wherein the displayed image is a geographic map showing physical positions of the different potential e-mail recipients relative to each other.

13. A computer-readable storage medium containing instructions that are executable by a computer to perform steps as recited in claim 6.

14. A system comprising:

a computer;

a program configured for execution by the computer, wherein the program performs the following steps when executed by the computer to create an e-mail distribution list:

displaying an image that graphically indicates different potential e-mail recipients and one or more relationships between the e-mail recipients;

positioning a graphical area selector with respect to the displayed image in response to user input, wherein the graphical area selector graphically encompasses an area representing a first set of the potential e-mail recipients;

creating the e-mail distribution list from the first set of the potential e-mail recipients.

15. A system as recited in claim 14, wherein the graphical area selector is a rectangle having a changeable size and position relative to the displayed image.

16. A system as recited in claim 14, wherein the positioning step comprises changing the size and position of the graphical area selector in response to user input.

17. A system as recited in claim 14, wherein the image is a geographic map showing relative positions of the different potential e-mail recipients.

18. A system as recited in claim 14, wherein:

the application program performs an additional step of selecting a second set of the potential e-mail recipients in response to a query selection by a user; and wherein the creating step comprises creating the e-mail distribution list from an intersection of the first and second sets of potential e-mail recipients.

19. A system as recited in claim 14, wherein the application program performs additional steps comprising:

selecting a second set of the potential e-mail recipients in response to a query selection by a user;

graphically highlighting the potential e-mail recipients that are in the second set.

20. A system as recited in claim 14, wherein:

the application program performs an additional step of selecting a second set of the potential e-mail recipients in response to a query selection by a user;

the creating step comprises creating the e-mail distribution list from an intersection of the first and second sets of potential e-mail recipients; and the image is a geographic map showing relative positions of the different potential e-mail recipients.

21. A user interface comprising:

a displayed image that shows individual entities and their relationships to each other;

a set selector that allows the user to define a first set of the individual entities;

wherein the individual entities that are members of the second set are graphically highlighted on the displayed image;

a graphical area selector displayed over the displayed image, the graphical area selector being changeable by a user to graphically define a second set of the individual entities;

an intersection of the first and second sets forming a selected group of individual entities.

22. A user interface as recited in claim 21, wherein the displayed image is a geographic map showing physical positions of the individual entities relative to each other.

23. A user interface as recited in claim 21, wherein the set selector is a drop-down control from which the user selects a predefined query.

24. A user interface as recited in claim 21, wherein the graphical area selector is a rectangle having a changeable size and position relative to the displayed image.

25. A user interface as recited in claim 21, wherein:

the displayed image is a geographic map showing geographical positions of the individual entities relative to each other;

the set selector is a drop-down control from which the user selects a predefined query; and the graphical area selector is a rectangle having a changeable size and position relative to the displayed image.

* * * * *